Jan. 19, 1960 P. A. REILING 2,922,151

TRANSLATING CIRCUITS

Filed Feb. 17, 1954 6 Sheets-Sheet 1

INVENTOR
P. A. REILING
BY W L Kefauver
ATTORNEY

Jan. 19, 1960 P. A. REILING 2,922,151

TRANSLATING CIRCUITS

Filed Feb. 17, 1954 6 Sheets-Sheet 2

INVENTOR
P. A. REILING
BY W. L. Keefauver
ATTORNEY

Jan. 19, 1960 P. A. REILING 2,922,151
TRANSLATING CIRCUITS
Filed Feb. 17, 1954 6 Sheets-Sheet 3

INVENTOR
P. A. REILING
BY W. L. Keefauver
ATTORNEY

Jan. 19, 1960 P. A. REILING 2,922,151

TRANSLATING CIRCUITS

Filed Feb. 17, 1954

6 Sheets-Sheet 4

INVENTOR
P. A. REILING
BY W. L. Keefauver
ATTORNEY

Jan. 19, 1960 P. A. REILING 2,922,151

TRANSLATING CIRCUITS

Filed Feb. 17, 1954 6 Sheets-Sheet 5

INVENTOR
P. A. REILING
BY W. L. Keefauver
ATTORNEY

Jan. 19, 1960 P. A. REILING 2,922,151

TRANSLATING CIRCUITS

Filed Feb. 17, 1954 6 Sheets-Sheet 6

INVENTOR
P. A. REILING
BY W. L. Keefauver
ATTORNEY

United States Patent Office 2,922,151
Patented Jan. 19, 1960

2,922,151

TRANSLATING CIRCUITS

Paul A. Reiling, Summit, N.J., assignor to Bell Telephone Laboratories, Incorporated, New York, N.Y., a corporation of New York Application February 17, 1954, Serial No. 410,924

20 Claims. (Cl. 340—347)

This invention relates to electrical translating circuits and primarily those whose response depends on the amplitude of an input signal.

The various features of the invention will be described below with reference to specific illustrative embodiments and, in particular, with reference to a comparison type coder for pulse code modulation systems employing a binary code. In this type of encoder, amplitude comparators for each of the binary digits are biased to define certain significant quantum levels, namely, those at which the binary character of that digit changes from binary 1 to binary 0, or vice versa. Samples of an input signal are applied to these comparators which indicate by their outputs the binary character of each digit for each sample. The illustrative encoders described below employ transistors and utilize a switching property of these devices which makes their use extremely advantageous.

An object of the invention is to decrease the complexity of amplitude comparators whereby the amplitude of one signal relative to the amplitude of either another signal or a fixed reference may be readily determined.

Another object of the invention is to simplify the encoding of a signal wave in a digital code.

Another object of the invention is to decrease the number of amplitude comparators necessary to translate a signal wave into a binary code by a comparison type coder.

Another object is to reduce coding errors where the conventional binary code is employed.

Other objects relate to improvements in electronic switches such as increasing Off/On discrimination, switching response, etc.

In accordance with principles of the invention, the number of amplitude comparators necessary to translate a signal into a binary code is decreased by employing for each digit other than the most significant digit a smaller number of comparators than there are, for that digit, quantum ranges encoded 1. The threshold levels at which these comparators respond are then switched among various alternative levels in response to the binary character of previously resolved higher order digits.

There are also described below various combinations of transistor switches employing principles of the invention whereby signals may be switched or gated depending on the relative amplitudes of two signals, either or both of which may be fixed, with an economy of apparatus and power dissipation.

Other objects and features of the invention may be readily understood from a consideration of the following detailed description when read in accordance with the attached drawings, in which.

In the following description of several comparison type coders, a three-digit binary code will be employed. Although the encoders described are less cumbersome, in most cases, where only a few digits are used, they may be expanded in obvious manners to accommodate more digits.

Figure 1:
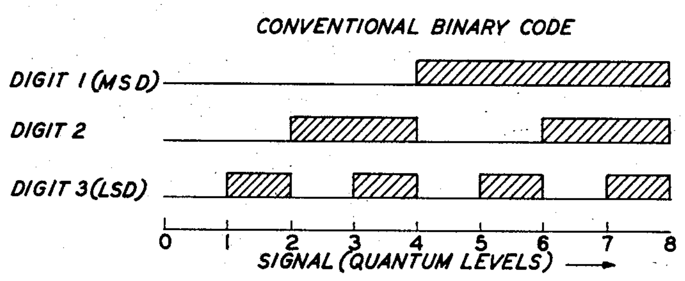
Figs. 1 and 2 illustrate the code patterns for the three-digit conventional and reflected binary codes, respectively.

Various binary codes may be employed. Fig. 1 represents the conventional binary code pattern for a three-digit code. Inspection of this code pattern will show that eight quantum levels ($2^n$, where $n$ is the number of digits) are recognized by unique combinations of the binary 1 and 0, the shaded portion of each digit indicating binary 1 and the blank portions binary 0. It will also show that for the most significant digit, there is a discrete range and for the remaining two digits there are several ranges of signal amplitudes in which the binary 1 is present in the code value of the signal.

Figure 2:
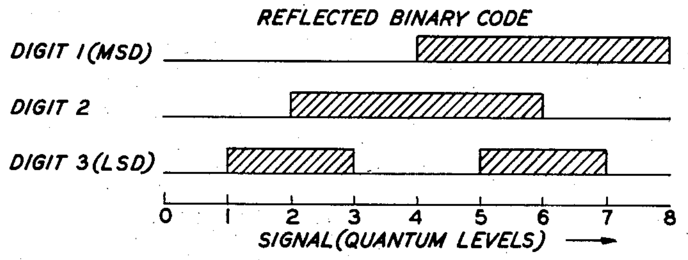

Fig. 2 illustrates the code pattern for the reflected binary code, which is described in more detail in Patent 2,632,058, dated March 17, 1953, to F. Gray. Similar observations will result from an inspection of this code pattern, with the exception that there is a single discrete range for each of the first and second most significant digits in which the binary 1 is present.

Figure 3:
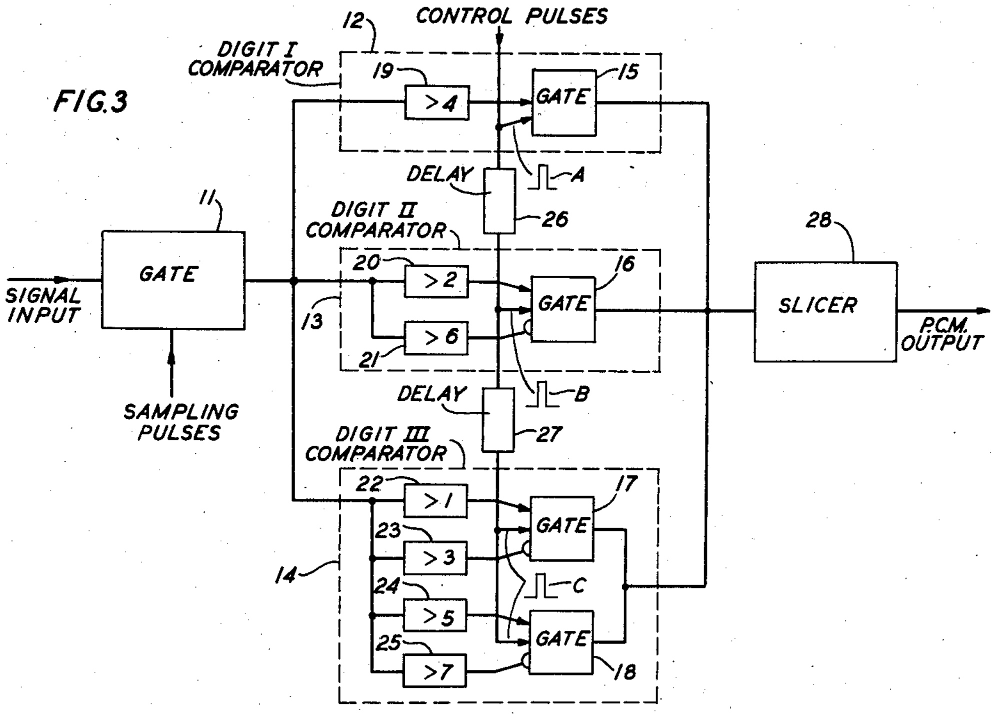
Fig. 3 illustrates functionally a comparison type PCM coder employing principles of the invention.

An input signal may be translated into a three-digit binary code, either conventional or reflected, by apparatus of the type illustrated functionally in Fig. 3. An economy of apparatus, as well as certain encoding advantages, results if the reflected binary code is employed, and it is for this code that the apparatus is illustrated. Samples of an input signal are obtained by the gate 11 to which periodic sampling pulses are applied. The amplitude samples obtained by this device are applied to three amplitude comparators 12—14, one for each digit. These comparators are illustrated functionally as comprising logic gates 15—18 having either enabling inputs or inhibiting inputs. In the drawing, an arrow at the input to a gate denotes an enabling input and a semicircle an inhibiting input. These gates, therefore, each have two enabling inputs and will produce an output only if both inputs are simultaneously enabled and, for gates 16—18, if an inhibiting input is not simultaneously present. Also associated with each gate are amplitude-sensitive devices 19—25, which will pass only signals greater than a certain threshold level. The numbers in the boxes representing devices 19—25 indicate these threshold levels in terms of quantum levels for each device.

Therefore, signals greater than quantum level 4 will partially enable the gate 15 in the digit I comparator 12. For the second most significant digit comparator 13, designated digit II, a signal greater than quantum level 2 will partially enable gate 16, although if greater than quantum level 6, gate 16 will be inhibited. The digit III comparator 14 comprises two gates 17 and 18, the first of which will be partially enabled by signals greater than quantum level 1 and inhibited by signals greater than quantum level 3. The second gate 18 will be partially enabled by signals greater than quantum level 5 and inhibited by signals greater than quantum level 7.

The apparatus in Fig. 3 uses the comparator output pulses as the code digit pulses. The duration of these pulses is equal to the duration of the control pulses A, B, and C, which complete the enabling of those gates 15—18 which are partially enabled by the signal input. By means of delays 26 and 27, the control pulses are applied in time sequence to the gates of comparators 12, 13, and 14, respectively, so that their combined outputs form a time sequence of code pulses with the most significant digit (digit I) first. Fig. 4A illustrates the relative timing and duration of the sampling and control pulses as well as the signal sample obtained by gate 11 and the PCM output.

The code digit pulses are made uniform in amplitude by a slicer 28 which may, for example, comprise a single-trip (monostable) multivibrator or a blocking oscillator which is triggered by the respective comparator outputs.

Alternative sampling and timing schemes are possible. For example, the sampling gate 11 can be eliminated by applying the control pulses A, B, and C to all gates 15—18 simultaneously. The control pulses, therefore, become the sampling pulses. In this case, delay networks at the outputs of the successive digit comparators are necessary to obtain a sequence of digit pulses. If a sequence is not necessary, delays are also unnecessary. With delays at the outputs of the comparator gates 12—14, the control pulses A, B, and C could be eliminated instead of the sampling gate 11, if desired. Further alternatives will be obvious; choice will depend in a particular application on such considerations as multiplexing, availability of control pulses, etc.

It may be seen that similar apparatus can translate an input signal into the conventional binary code, although, at least functionally, three more comparator gates or switches will be required, one more for the digit II comparator and two more for the digit III comparator, since, due to the nature of the conventional code, there are twice as many discrete ranges encoded 1 for each digit other than the most significant. In fact, the conventional code requires $2^n-1$ comparators, whereas the reflected code requires but $2^{n-1}$. As with the digit I comparator in Figs. 3 and 4, however, no inhibitor is necessary for those comparator gates which recognize discrete binary 1 ranges which include the highest encoded quantum level (level 8 in the present illustration). With the conventional code, there will be one such gate for each digit comparator. Use of the conventional code in this type of coder also entails the possibility of substantially larger coding errors. As explained in the Gray patent noted above, use of the reflected code limits errors in the decoded signal due to ambiguities in the encoding process to a maximum of one quantum step.

Figure 4:
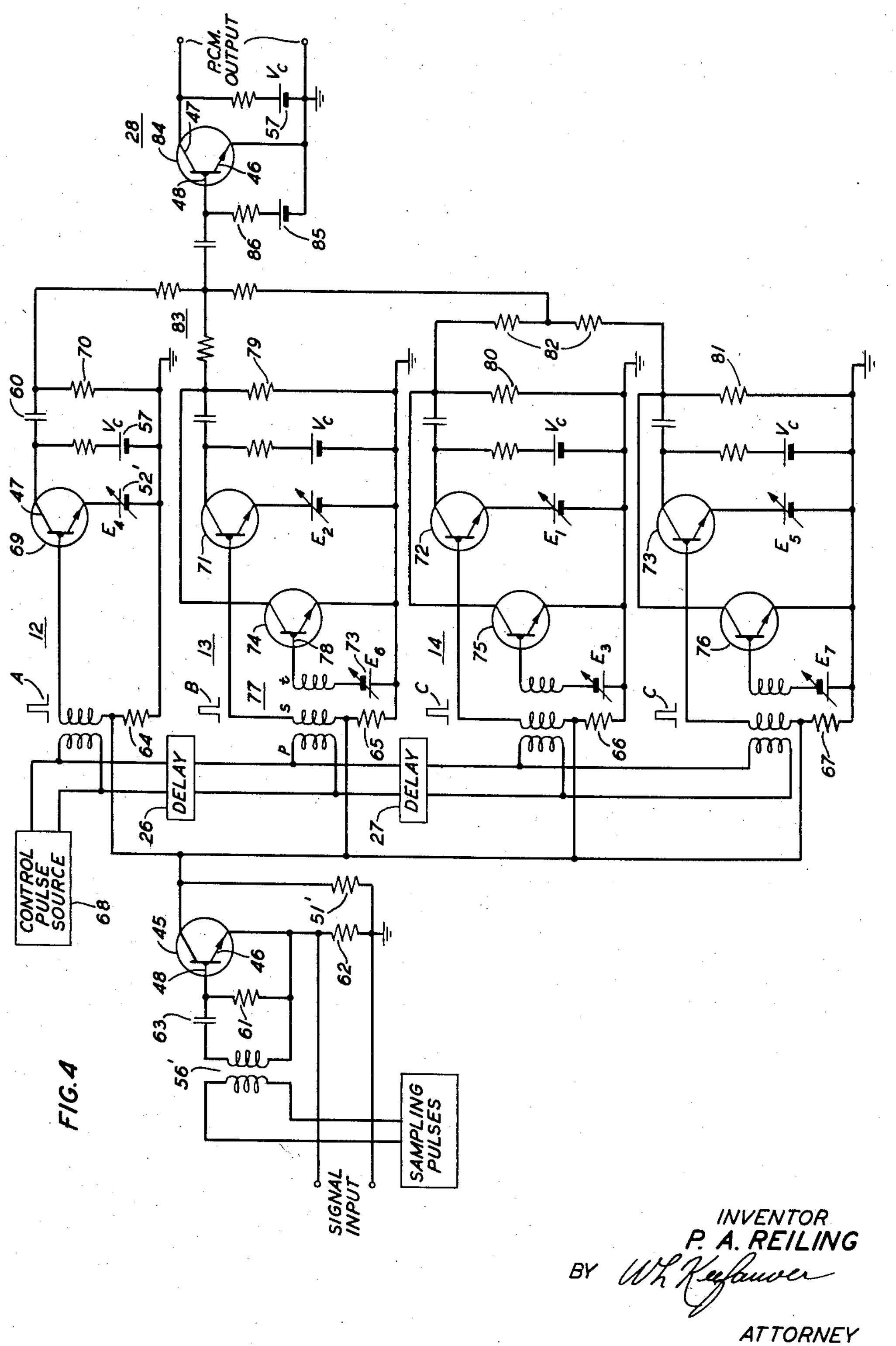
Fig. 4 is a circuit schematic diagram of a specific encoder of the type illustrated functionally in Fig. 3; and the wave forms in Fig. 4A aid in the description of Fig. 4.
Figure 4A:
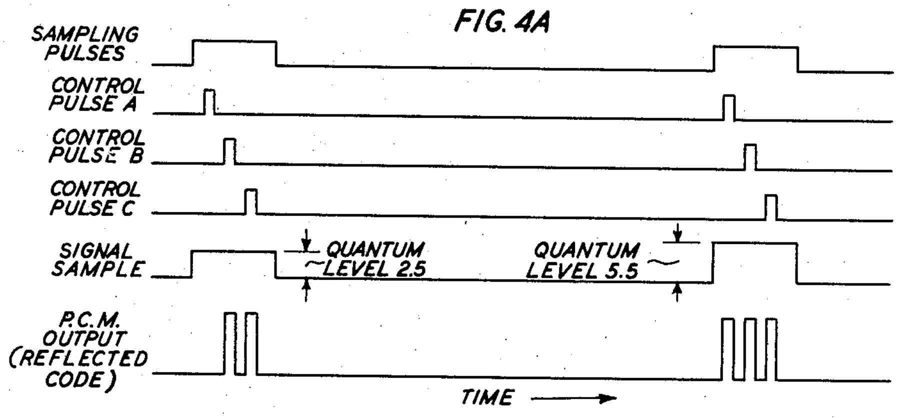

Fig. 4 illustrates details of an encoder of the type illustrated functionally in Fig. 3. The various gates and amplitude-sensitive devices are implemented by junction transistors, the operation of which may be better understood by first referring to Figs. 5 and 6.

These circuits utilize unique properties of transistors which are not ordinarily realizable with vacuum tubes. These properties are illustrated by the family of characteristics shown in Fig. 6. This figure shows the relation between collector voltage measured from collector to emitter ($V_{ce}$) and collector current ($I_c$) for several values of base current ($I_b$) which was obtained by the circuit shown in Fig. 5. The latter figure shows an n-p-n transistor 41 having base 42, emitter 43, and collector 44 electrodes connected in common-emitter configuration, i.e., input between base and emitter and output between collector and emitter.

Throughout the present description, n-p-n junction transistors are employed, although p-n-p junction transistors could equally well be used. Point-contact transistors are also usable but, in general, have a larger $I_{co}$ (the collector current which flows when the emitter current is zero), for which compensation will generally be necessary.

The unique properties of transistors which these characteristics illustrate and which applicant has utilized to effect novel and efficient switching circuits may be stated briefly as follows:

(1) A significant and fairly linear range of flat slope representing low resistance between collector and emitter; this range is characterized further by fairly large collector currents for very small collector-emitter voltages; (in the illustrative characteristics shown in Fig. 6, collector currents of over five mils are obtained for collector-emitter voltages of less than 0.1 volt when $I_b=2.0$ milliamperes);

(2) Substantial symmetry, showing that either polarity of collector voltage may be employed; and (3) Intersection of the $V_{ce}$ and $I_c$ axes at zero, indicating that the switching signal will not appear in the output, i.e., no "pedestal."

A curve for $I_b=0$ has not been shown since in the range of collector voltages shown, the current in the collector was fairly constant and less than a microampere and, on the scale used in the drawing, would result in a curve coinciding with the voltage axis. It did, however, indicate a very high resistance from collector to emitter in this cut-off condition. For $V_{ce}$ greater than 0.1 volt, a high collector-emitter resistance is also indicated. Therefore, three significant regions of collector-emitter resistance exist:

(1) base current cut-off—high resistance
(2) base current On-low $V_{ce}$—low resistance
(3) base current On-high $V_{ce}$—high resistance By way of illustration, the Off resistance between collector and emitter is on the order of megohms while the On resistance, i.e., the low resistance, is on the order of ohms. To be more specific, the characteristics in Fig. 6 were obtained with an alloyed junction transistor. In the base current cut-off region, a collector-emitter resistance of over 10 megohms was measured. In the low-resistance condition, this resistance was 50, 25, and 12.5 ohms for $I_b=0.5$, 1.0, and 2 milliamperes, respectively. This indicates, as do the curves, that larger base currents not only extend the linear range of low resistance but also decrease the resistance in this region. In fact, low resistances of less than one ohm have been obtained by using very high base currents, on the order of 80 milliamperes. A high alpha (current multiplication factor) will also increase the linear range as well as the sensitivity, i.e., milliamperes of collector current per milliamperes of base current.

These unique characteristics are utilized in the novel circuits to be described. These circuits take the form of transistor switches or combinations of such switches, utilizing primarily the high collector-emitter resistance when the base current is cut off and the low resistance when the base current is On and $V_{ce}$ is low, to effect sensitive, fast-operating On/Off switches. In general, a series collector resistor is employed to limit the collector current so that the high collector-emitter resistance region in which small signal grounded-emitter amplifiers normally operate will not be realized. This latter region, however, provides "transistor limiting" and is available to limit the collector current, if necessary.

Figure 5:
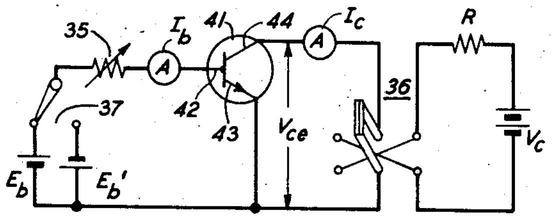
Fig. 5 illustrates by a circuit diagram a transistor connected in a circuit whereby the circuit characteristics shown in Fig. 6 might be obtained.

This switching action may be understood by referring to Fig. 5. Base current is controllably applied to the transistor by a battery $E_b—E_b'$ and a variable resistor 35 and collector voltage is supplied from battery $V_c$ through a series limiting resistor R and a reversing switch 36. To obtain the curves in Fig. 6, resistor 35 was made large to obtain a constant-current source.

When switch 37 is to the right, the base 42 is negative with respect to the emitter, base current is cut off, and the resistance from collector 44 to emitter 43 is very high. In this condition, the switch, that is, the transistor as a switch, is Off or open. When switch 37 is thrown to the left, the base current will be turned On and if $V_c$ and R are properly proportioned to keep $V_{ce}$ very low, e.g., less than .1 volt, the resistance from collector to emitter can be made extremely low by adjusting resistor 35 to provide sufficient base current. In this condition, the switch is On or closed. Obviously, if $R=0$, $V_c$ must be quite small. The addition of a series resistor R to absorb by a voltage drop most of the voltage of $V_c$, however, permits the use of large sources for $V_c$, advantages of which are brought out below.

It may be observed that by throwing switch 36, substantially identical results will be obtained by turning the base current Off and On. Either polarity of $V_c$ can therefore be accommodated by the switch. When the polarity of $V_c$ is reversed, the functions of emitter 43 and collector 44 are also reversed.

Figure 6:
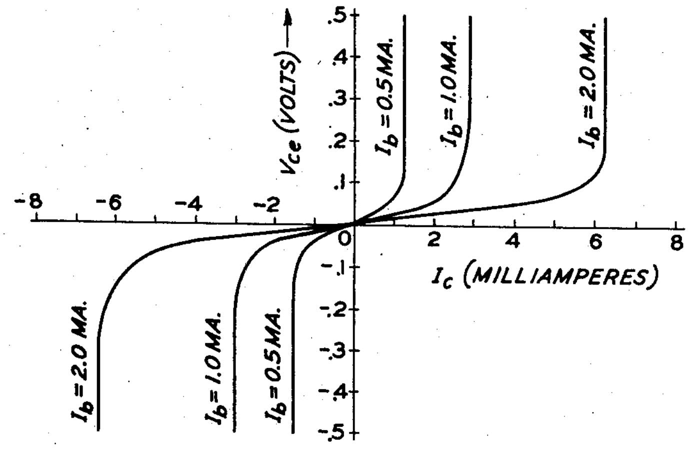

A detailed discussion of the physics which give rise to the characteristics described is believed unnecessary, since the characteristics illustrated by Fig. 6 will give a sufficient understanding to one skilled in the art to practice the present invention. However, a brief mention will be made of a theory which is believed to explain the phenomena of the low-resistance conditions.

Figure 5A:
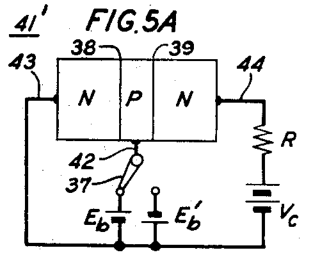
Figs. 5A illustrates pictorially an n-p-n junction transistor connected in a circuit similar to that in Fig. 5.

Fig. 5A illustrates an n-p-n junction transistor pictorially as comprising a layer of p-type semiconductor material intermediate two n-type portions. The p-layer represents the base while the two p-n junctions 38 and 39 perform the functions of emitter and collector, respectively. The electrodes have, in fact, been numbered similarly to those in Fig. 5. When the base current is biased to cut-off, switch 37 right, both p-n junctions are reverse biased and the resistance between electrodes 43 and 44 will be the sum of these high resistances which exist across these two junctions when so biased.

When a current is applied to the base, the emitter junction 38 emits minority carriers into the base layer. These carriers are attracted to the collector junction 39 and appear as current in the collector electrode. For normal transistor action, the collector junction is reverse biased, representing the second region of high collector-emitter resistance mentioned above. In the present applications, however, the voltage applied between collector and emitter, although appearing externally to apply a reverse bias to the collector junction 39, is sufficiently small so that when effects internal to the transistor are accounted for, both emitter and collector junctions are forward biased, and both, in fact, are emitting minority carriers into the base layer. Thus, the more current applied to the base 42, the more minority carriers drawn from both *n* layers and the lower the forward resistances of these junctions. In this condition, the resistance between the emitter 43 and collector 44 electrodes is the sum of two low resistances instead of one or two high resistances.

Since either junction 38 or 39 can act as emitter or collector, the phenomenon is obtained with either polarity of collector voltage, giving rise to the symmetrical characteristics shown in Fig. 6. Complete symmetry can be obtained by purposely fabricating the emitter and collector junctions with this end result in mind and the characteristics in Fig. 6 were, in fact, obtained from such a unit. Symmetry makes the switch bilateral; for example, $V_c$ could be a signal source producing signals of either polarity which are switched under control of the base current.

Figure 7:
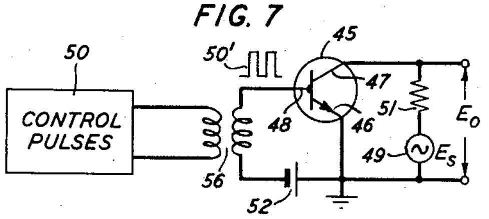
Figs. 7 through 10 are circuit diagrams of various types of transistor switches employing principles of the invention, each of which utilizes in one way or another unique properties of transistors illustrated by the characteristics in Fig. 6; the wave forms in Figs. 7A through 10A aid in understanding the operation of their associated circuits.
Figure 7A:
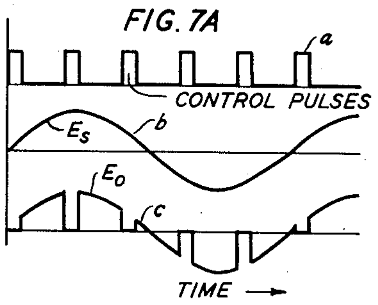

Fig. 7 illustrates a simple application of the switching action just described. A signal source 49 in series with a resistor 51 is connected in series with the collector-emitter path 47—46 of a transistor 45, and a control signal in the form of positive pulses from source 50 is applied between the base and emitter electrodes 48 and 46. (Transistor electrodes are similarly numbered from here on.) The base 48 is normally cut off by a bias battery 52. Under this condition, the output voltage is equal to the signal voltage, since the collector-emitter resistance is high and, relative to the internal impedance of source 49 and resistor 51, substantially an open circuit. A control pulse applied to the base electrode 48 closes the switch and effectively short-circuits the signal source so that the resultant output wave is a chopped version of the sinusoidal input signal wave. Wave forms *a*, *b*, and *c* in Fig. 7A represent, respectively, the control pulses, the signal wave, and the output wave.

Figure 8:
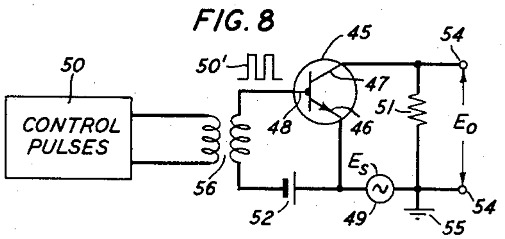
Figure 8A:
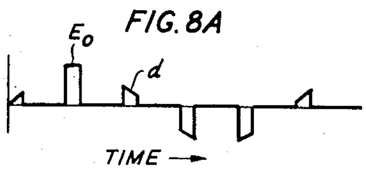

In Fig. 8, the signal source 49 is isolated from the output 54 of the transistor switch by connecting the signal source between emitter 46 and ground 55 and by connecting the current limiting resistor 51 to ground 55. In this case, the switch is in series with the signal source so that samples of the sinusoidal signal will appear across the output load resistor 51 only when the switch is closed. As with the Fig. 7 circuit, the switch is closed by positive control pulses 50′ applied between base 48 and emitter 46 which are of sufficient amplitude to overcome the cut-off bias provided by battery 52. Because of the extremely low "closed" switch resistance, these signal samples will be equal in amplitude to the signal amplitude. This circuit is, therefore, an amplitude sampler, samples of the signal wave appearing at the output only when a control pulse applied to the base overcomes the bias of the battery 52. Wave form *d* illustrates the output wave form with a source 49 producing sinusoidal waves.

If the signal were always positive with respect to the collector 47, only a small bias would be required for cut-off. If, however, signals that are negative with respect to the collector are to be accommodated, the bias voltage of battery 52 required for cut-off must be large enough to maintain the base negative with respect to the collector for the largest applied negative signal voltage. Otherwise, the collector 47, acting as an emitter, would cause unwanted portions of the signal to flow to the output even though the switch is nominally open. The switching pulses 50′ must be large enough to overcome the bias battery 52 and saturate the base. Although transformers 56 have been indicated to apply the control pulses to the switches illustrated in these figures, RC coupling circuits could alternatively be employed.

In Figs. 7 and 8, no collector supply battery is necessary; the signal source performs this function. Further, resistor 51 is proportioned relative to the maximum signal voltage to keep $V_{ce}$ sufficiently low so that a low collector-emitter resistance will be realized when the base is turned On.

Figure 9:
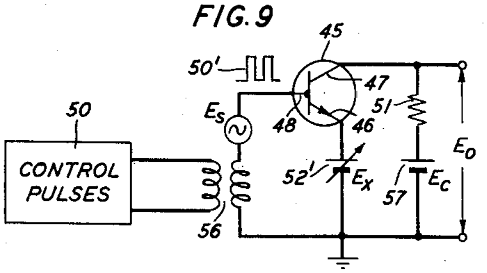
Figure 9A:
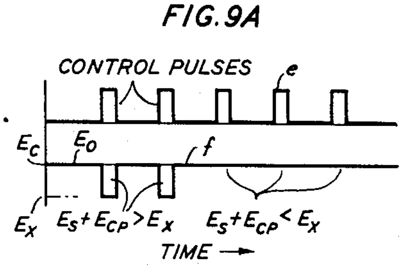

An extension of the two circuits just described is illustrated in Fig. 9. In this case, the signal wave $E_s$ is applied in series with the control pulses 50′, and cut-off is determined by a bias battery 52′ connected in series with the emitter. If the combination of control pulse and signal voltage is insufficient to overcome the reverse bias $E_x$ on the emitter, the output voltage will be $E_c$, the voltage of the collector supply battery 57. If the signal plus control pulse are sufficient to overcome this reverse bias, the collector voltage $E_c$ will drop to $E_x$ and produce an output indicating that the signal wave is greater than a voltage determined by the magnitude of $E_x$ and the amplitude of the control pulses. This circuit is, therefore, an amplitude comparator and produces an output only if the signal, when superimposed on a control pulse, is greater than a standard value $E_x$ determined by the adjustment of bias battery 52′. Fig. 9A represents an output wave form *f* produced over a time interval during which there were two occasions on which the combination of control pulse ($E_{cp}$) wave form *e* and signal ($E_s$) were sufficient to overcome $E_x$. The magnitude of $E_x$ is proportioned to prevent the signal from turning On the switch in the absence of a control pulse.

A further extension of these principles is illustrated in

Figure 10:
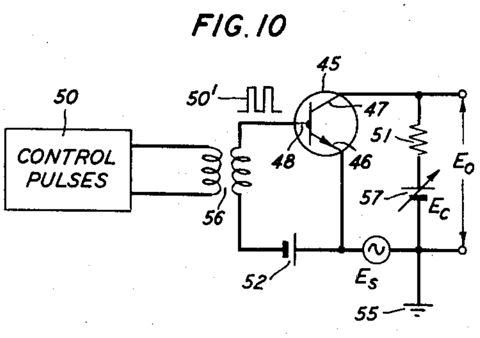

Fig. 10. In this circuit, the signal is applied between emitter 46 and ground 55, and control pulses are applied between the base 48 and emitter 46. Each control pulse 50′ is sufficient to overcome the negative bias on the emitter and, therefore, close the switch. When the switch is closed, the amplitude of the signal voltage will be compared with the voltage $E_c$ of the collector battery 57′. If the signal voltage is less than $E_c$, the output voltage will drop, and if greater than $E_c$, it will rise; in each case, the rise or fall will indicate the amount of the difference as well as the sense.

Figure 10A:
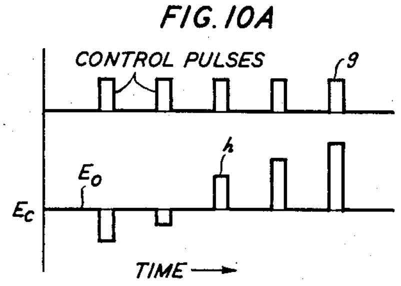

The output wave form *h*, Fig. 10A, illustrates an output wave form produced by a signal which was first less than $E_c$ and then became greater than $E_c$. A significant difference between Figs. 9 and 10 is that with the pedestal-type comparator shown in Fig. 9, the output merely indicates in a "yes"—"no" manner whether the signal $E_s$ is greater or less than the comparison voltage $E_x$, a "no" being indicated by no pulse output. The direct comparator shown in Fig. 10, however, provides the additional information of "how much" greater or less, on a linear scale, than the comparison voltage $E_c$.

The comparison coder shown in Fig. 4 employs various forms of these switches just described. The sampling circuit 11 is of the type shown in Fig. 8. In this case, however, self-bias derived by the resistor 61 and capacitor 63 replaces the bias battery 52 employed in Fig. 8. Input signals are developed across resistor 62. These are biased, if necessary, so as to have only positive values. When a sampling pulse of sufficient amplitude to overcome the self-bias is applied between the base 48 and emitter 46 of transistor 45 by the transformer 56′, a voltage will be developed across resistor 51′ which is directly proportional to the amplitude of the input signal.

The signal samples are applied to the three digit comparators 12—14 in parallel and appear across resistors 64—67. Control pulses designated A, B and C are also applied to each of these comparators from a control pulse source 68.

The digit comparators utilize the transistor switch properties just described and in this case employ a comparison type configuration similar to that shown in Fig. 9. The comparator for determining the existence of the digit I pulse employs a transistor 69 and is simplified since it need determine only whether an input sample is greater than quantum level 4. The collector 47 of this comparator is at the potential of the collector battery 57, $V_c$, when no current flows in the base. The base-emitter current is cut off by the bias voltage $E_4$ and approaches conduction when the control pulse A is applied. However, no base current flows until the combination of control pulse A and signal across resistor 64 is sufficient to overcome the bias $E_4$. When this occurs, in this case for signals greater than the quantum or threshold level of 4 the collector-emitter resistance is reduced to a very low value; and the collector-to-ground potential across resistor 70 drops from $V_c$ to approximately $E_4$, producing an output pulse denoting the binary 1. This output pulse is equal in duration to the duration of control pulse A and is negative when $V_c$ is positive and larger than $E_4$. By making the difference between $V_c$ and $E_4$ great, a large negative output pulse is obtained when the signal is greater than the level 4. Capacitor 60 isolates transistor 69, for direct currents, from the output.

In a similar manner, the bias $E_2$ on the single digit II comparator comprising transistor 71 and the biases $E_1$ and $E_5$ on the two digit III comparators comprising transistors 72 and 73 are adjusted so that these comparators produce output pulses when the signal level is greater than quantum levels 2, 1, and 5, respectively. In each case, the amplitude of the control pulses B and C is accounted for.

A further requirement is imposed on the digit II and III comparators 13 and 14, namely, that no output, i.e., binary 0, should be produced when the signal is greater than the upper boundary levels of the shaded portions of the code pattern illustrated in Fig. 2. This requirement is met by employing transistors 74, 75, and 76 to short-circuit the outputs of these comparators when the signals are greater than the specified upper boundary levels.

In the digit II comparator 13, a third winding *t* of pulse transformer 77 applies a pulse to the base 78 of an output shorting transistor 74 only when the combination of control pulse B, signal voltage, and bias $E_2$ permits a base current pulse in the main comparator transistor 71. (The three windings of transformer 77 are mutually coupled.) The bias $E_6$ maintains the base-emitter current of transistor 74 at cut-off until a pulse in the base-emitter circuit of this transistor due to base current in the comparator transistor 71 becomes high enough to overcome the bias $E_6$. Biases and other parameters are adjusted so that this occurs at quantum level 6. At this level, transistor 74 is switched On, thereby shunting the very low collector-emitter resistance of transistor 74 in this condition directly across the output resistor 79 of the comparator transistor 71. No collector supply battery as such is employed by transistor 74 so that when transistor 74 is On, both ends of resistor 79 are at substantially ground potential. Battery 73 provides all the necessary supply voltage for this transistor.

In a similar manner, the upper boundary limits of quantum levels 3 and 7, respectively, are impressed on the two digit III comparators by the use of the output shorting transistors 75 and 76 having associated cut-off biases of $E_3$ and $E_7$, respectively.

The outputs of the digit III comparators 72 and 73, appearing across resistors 80 and 81 are combined by resistors 82 and all three digit comparator outputs are combined in a second resistance network 83. The combined output pulses of these comparators are in the sequence determined by the time sequence of control pulses A, B, and C. These pulses are staggered, as indicated in the timing diagram, Fig. 4A, by two delay networks 26 and 27.

Since the output pulses of the various comparators may not be identical in amplitude, a standard output amplitude pulse amplifier 28 is employed to provide uniform output code pulses. This device serves as a slicer and consists of a single transistor 84 in which the transistor switch properties described above are utilized. As shown, the base 48 is biased positively by the battery 85 in series with resistor 86 so that the collector-emitter resistance is normally low. This resistance will stay low until the base-emitter current is cut off by a negative digit pulse from any one of the three comparators 12—14, at which time the collector-emitter resistance of transistor 84 approaches an open circuit. The emitter 46 is connected to ground so that the collector 47 is normally at approximately ground potential until switched to the collector battery 57 potential $V_c$ by the application of a digit pulse to the base. The resulting output pulse is, therefore, approximately equal to the collector battery voltage $V_c$ and is independent of the amplitude of the comparator output pulses which need only be sufficiently large to cut off the base-emitter current of the output transistor 84. The output pulses can be made either positive or negative with respect to ground by making the collector battery positive or negative with respect to ground.

Alternatively, the output pulse amplifier 28 can be biased to cut-off and turned On by positive pulses of varying amplitudes which need only be sufficient to provide enough base current to drive the transistor to its low output resistance condition. A similar amplifier may be employed to provide the constant amplitude control pulses A, B, and C.

An inspection of the three-digit conventional binary code pattern in Fig. 1 will show that there are seven shaded ranges of signal amplitudes which require a digit pulse i.e., binary 1, when the signal lies within these discrete ranges. There are only four such ranges in the reflected binary code pattern illustrated in Fig. 2. An encoder built to encode in the conventional binary code similarly to the one illustrated in Fig. 3 or 4, therefore, requires seven comparisons to determine the presence of absence of a digit pulse for each of eight quantum levels and will be subject to large coding errors in the case of ambiguities. However, of these seven ranges, only one range for each digit is pertinent to code a particular signal level. Therefore, by determining the three pertinent ranges, the number of comparisons can be reduced to three and, as will be described, coding errors will be limited to one quantum step.

In accordance with further principles of the invention, such a determination is made by encoding sequentially commencing with the most significant digit. For digit I, there is only one pertinent lower boundary, namely, quantum level 4, so that this comparator need determine only the relation of an input signal to this level. For digit II, there are two lower boundary levels, quantum levels 2 and 6. Quantum level 2 is pertinent as the lower boundary only if digit I is a 0 and quantum level 6 is pertinent only if digit I is a 1. Applicant has used this information to advantage and in an illustrative circuit next to be described, the pertinent threshold level of the digit II comparator is normally adjusted to quantum level 2 and switched to quantum level 6 only if digit I is binary 1. The binary character of the first digit pulse is therefore used to determine the appropriate threshold level of the digit II comparator.

A further inspection of Fig. 1 will show that the pertinent threshold levels for digit III can be reduced from 4 to 2 when the binary character of digit I is determined and can be further reduced to 1 when the binary character of digit II is also determined. For example, if digits I and II are binary 0 and 1, respectively, it is clear that quantum level 3 is the only pertinent lower boundary level in the third digit position. By employing this knowledge derived from the nature of the code pattern, the upper boundary of each discrete range for each digit is eliminated as a necessary condition, making it necessary to determine only if the signal is greater than a lower boundary level.

Figure 11:
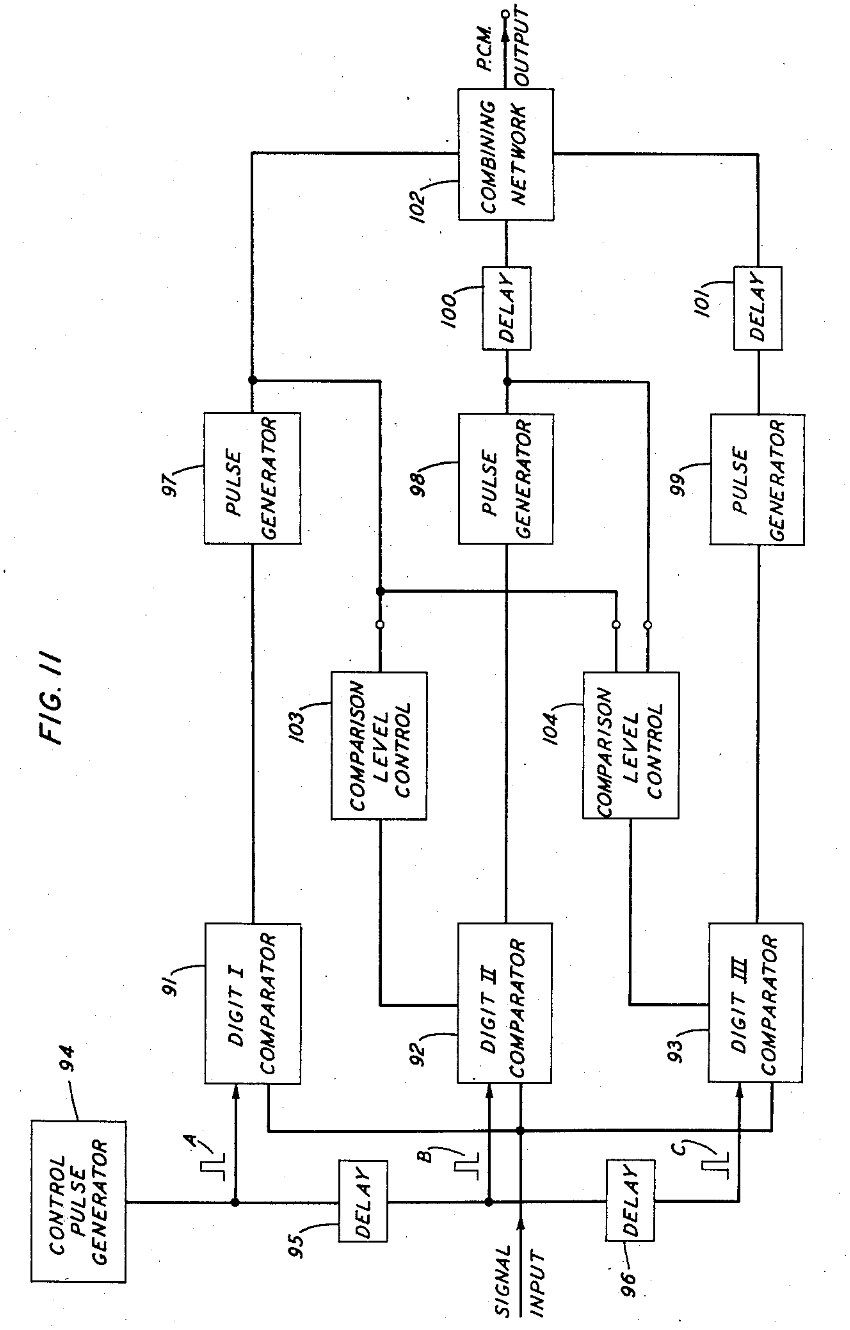
Fig. 11 illustrates by block diagram another type of comparison coder employing principles of the invention.

Fig. 11 illustrates an encoder for the conventional binary code employing these principles. This encoder employs only three comparators 91, 92, and 93, one for each digit, which make comparisons in the time sequence determined by the sequence of the control pulses A, B, and C supplied by the control pulse generator 94. These are staggered by delays 95 and 96 so that successive digit comparisons are influenced by the results of preceding higher order digit comparisons and all comparisons are made within the time duration of the first digit pulse.

Each comparator produces an output pulse when the signal is greater than an established comparison or threshold level. These output pulses trigger pulse generators 97—99 which may comprise single-trip multivibrator or blocking oscillators and which provide the digit pulses. By means of the delay networks 100 and 101 and combining network 102, these output pulses are combined sequentially to form the desired code output.

The digit pulses produced by the pulse generators 97 and 98 are also routed to comparison level controls 103 and 104 associated with the lower order digit comparators to control the comparison level of these latter comparators. For example, the comparison level control 103 switches the comparison level of the digit II comparator 92 from quantum level 2 to level 6 if enabled by a pulse, denoting binary 1, from the digit I pulse generator 97. The comparison level control 104 of the digit III comparator 97 receives information from pulse generators 97 and 98 and switches the comparison level of the digit III comparator from 1 to 3 if digits I and II are 0 and 1, respectively, from 1 to 5 if digits I and II are 1 and 0, respectively, and from 1 to 7 if digits I and II are both 1. By these means, the input signal is directly quantized and coded.

Figure 12:
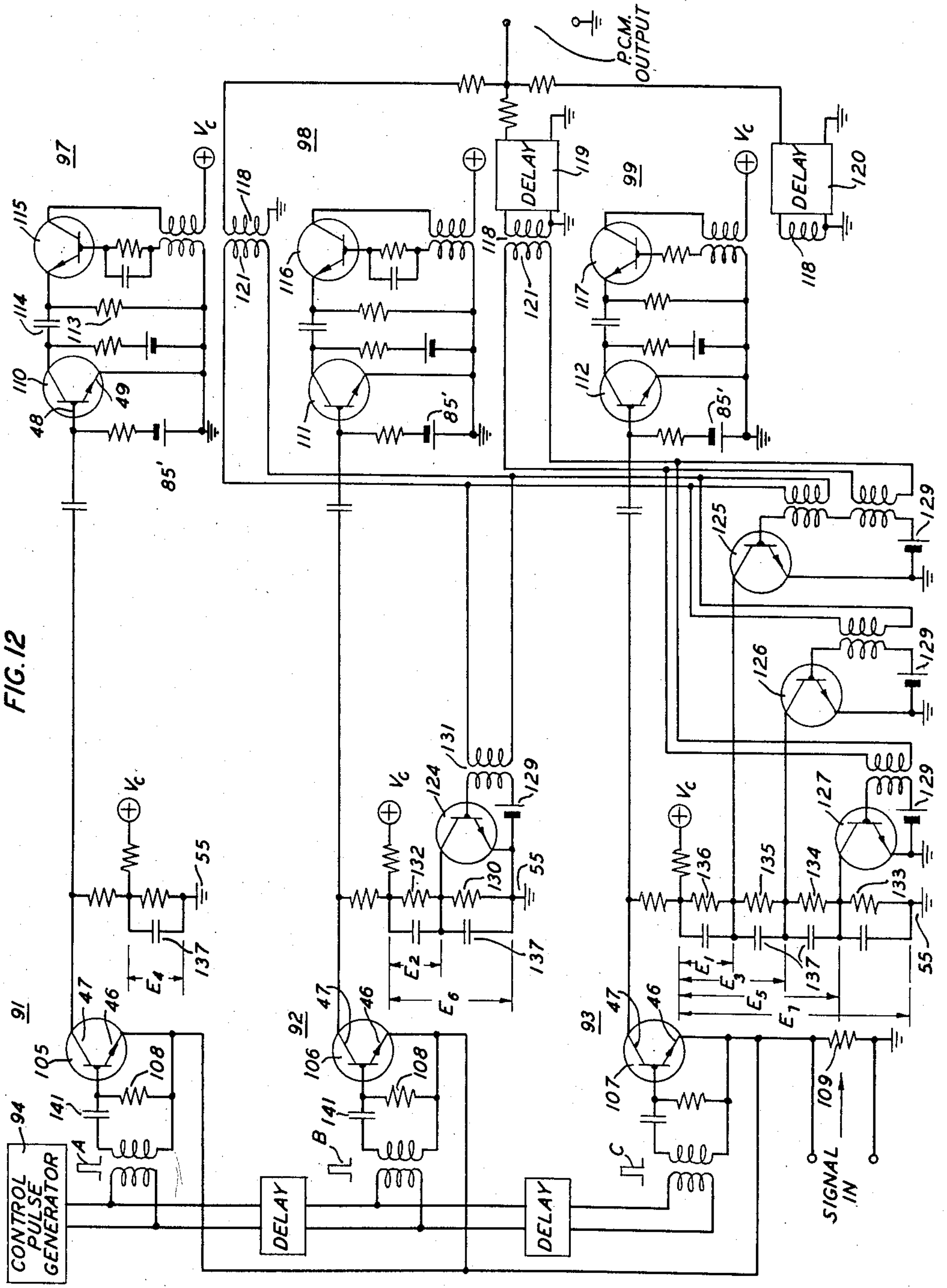
Fig. 12 illustrates by circuit diagram, an implementation of the coder illustrated in Fig. 11, also embodying principles of the invention.

Circuits for performing the functions illustrated in Fig. 11 are shown in Fig. 12. In this coder, direct comparators of the type illustrated in Fig. 10 are employed instead of the pedestal type comparators employed in Fig. 4. Junction transistors 105, 106, and 107 are again used as switches which present an extremely high collector-emitter resistance when the base current is cut off and a very low collector-emitter resistance when the base is made conducting by the application of a pulse between base and emitter. During the open switch interval, the base current of each of the three digit comparators is cut off by the self-bias developed by the capacitors 141 and resistors 108 which interconnect the base and emitter electrodes of each transistor. In this condition, the collector 47 to ground 55 voltage is equal to the collector supply voltage, which also serves as the comparison voltage. For the digit I comparator 91, this is adjusted to be $E_4$, a voltage equivalent to quantum level 4, for the digit II comparator 92, $E_2$, and for the digit III comparator 93, $E_1$. The control pulses A, B, and C applied to the respective comparator switches 105—107 in time sequence are of sufficient amplitude to close these three switches and effectively connect the emitters 46 to their respective collectors 47 by a short circuit.

When closed, therefore, the collector-to-ground or output voltage of each switch is equal to the difference between the emitter-to-ground potential and the collector-to-ground potential. The emitter-to-ground potential represents the signal amplitude which appears as a voltage drop across the input resistor 109 common to all three transistors 105—107. Therefore, during the switching interval of the control pulses, the input signal is compared with the various collector supply voltages. (The input signal is biased, if necessary, by means not shown so that at the input to the encoder, resistor 109, it has only positive values.) If the signal and comparison voltages are equal, no output, i.e., binary 0, is produced. If the signal is greater than the comparison voltage, a positive output pulse is obtained, and if less than the comparison voltage, the output pulse is negative.

The latter information is unnecessary so that only the positive pulses are amplified by transistor amplifiers 110—112 similar to the amplifier 28 shown in Fig. 4. In this case, the base 48 of each amplifier is biased slightly negative with respect to the emitter 49 by battery 85' so that only positive input signals are amplified. These pulses are differentiated by the RC interstage circuits 113 and 114 and applied to trigger code digit pulse generators 97—99. These generators comprise transistors 115—117 connected as blocking oscillators, each having an output winding 118. (A complete description of a transistor blocking oscillator is given in an application of J. H. Felker, Serial No. 242,442, filed August 18, 1951, which issued as United States Patent 2,745,012 on May 5, 1956.) The output code pulses on windings 118 are uniform as to shape and duration and are combined and delayed, if necessary, by the delay networks 119 and 120 to form a sequential code output.

The blocking oscillators 115 and 116 associated with the digit I and digit II comparators are each provided with a second output winding 121 for supplying the pulses produced by the digits I and II code generators, if any, to the transistor switches 124 through 127. These switches control the comparison voltages of the lower order digit comparators 92 and 93 which, as mentioned, are adjusted in the absence of input signals to the lowest level for that digit.

The digit II comparator transistor 106 is normally provided with a comparison level $E_2$. The transistor 124 is biased On by battery 129 so that in the absence of an output pulse on winding 121 of the digit I code pulse generator 97, the collector-emitter resistance of transistor 124 is very low. In this condition, the lower portion 130 of the voltage divider to which the collector supply voltage $V_c$ is applied is effectively short-circuited. When the digit I comparator produces a binary 1, indicated by an output pulse in winding 121 of code pulse generator 97, this digit pulse is applied to transistor 124 by transformer 131 with the proper polarity to cut off the base current of this transistor and thereby remove the short-circuit on resistor 130. Under this condition, the divider comprising resistors 130 and 132 is proportioned to provide a comparison level of 6 instead of 2.

Similarly, the digit III comparator transistor 107 is provided with a voltage dividing collector supply network, various portions of which are short-circuited or not in response to the binary character of higher order digits. When digits I and II are both 0, transistor switches 125, 126, and 127 are each biased by batteries 129 to their low collector-emitter resistance condition so as to short-circuit resistors 133—135 and provide a comparison voltage of $E_1$.

When digit II is a 1 and digit I a 0, digit pulses will be applied to transistors 125 and 127. These pulses will alter the output resistance conditions of transistors 125 and 127 but since the output of transistor 126 remains in its short-circuit condition, the only effect of these changes is to remove the short-circuit on resistor 135. This, as indicated, will raise the comparison voltage to $E_3$.

When digit I is a 1 and digit II a 0, both of transistors 125 and 126 will be altered, since digit I pulses are applied to both of these switches. This will raise the comparison voltage to $E_5$ by removing the short-circuits on resistors 134 and 135. When digits I and II are both 1, all three short-circuits will be disabled to raise the comparison level to $E_7$.

In this manner, the comparison level of successively lower order digits is influenced and determined by the binary character of the previously determined higher order digits.

It should be noted that either a digit I pulse or a digit II pulse will switch transistor 125 to its high output resistance condition.

The resistors 130, 132, and 133—136 are preferably made large relative to the collector-emitter resistance of the various shorting transistors 124—127 when in their On or closed condition so that these transistors, in this condition, can be considered practically as short-circuits. The various capacitors 137 which shunt these resistors reduce peak power drain by providing the output current when their associate comparison transistor switches 105—107 are closed.

In both of the coders described in detail, comparisons are made with established voltages which can be assigned values to provide unequal discrete ranges so that tapered or non-linear quantization can be obtained. Compression for comparing can therefore be readily provided as a part of the encoding process.

A feature of the encoder described with reference to Figs. 11 and 12 is that coding errors due to ambiguities and the like are limited to one quantum step. This type of error is discussed in detail in the above-noted Gray patent and arises, for example, where an input signal overlaps a transition from binary 1 to 0 or vice versa at a quantum level boundary. For example, with prior art encoders, a signal of precisely quantum level 4 might, in the conventional code be encoded 000 by an error in only the first digit but representing an error in the decoded signal of four quantum levels. Use of the reflected code limits such errors to one quantum step but requires either more cumbersome decoding apparatus or apparatus for translating into the conventional code which is easier to handle.

The coders in Figs. 11 and 12, however, encode in the conventional code and limit coding errors to one quantum step, thus obtaining prime advantages of both codes. That coding errors are so limited can be seen by referring to Figs. 1 and 12. In the absence of input signals, the digit I, II, and III comparators 91—93 are biased to quantum levels 4, 2 and 1, respectively. Should an input signal of slightly greater than quantum level 4 for some reason fail to enable the digit I comparator, the digit II comparator, being biased to a comparison level of 2 will most certainly be enabled and raise the bias level of the digit III comparator to level 3 so that it will also be enabled. The resultant code output, 011, will result in a decoded error of only one quantum step. A further study of this pattern will show that transitional errors, as they are sometimes known, will be limited in all cases to one quantum step.

Although the invention has been described with reference to specific embodiments, these are merely illustrative of the invention as are specific values, where given, and are not intended to be limiting since other embodiments and modifications will readily occur to one skilled in the art.

What is claimed is:

1. Signal quantizing apparatus for translating a signal wave into $2^n$ quantum levels represented by permutations of an $n$ digit binary code, said apparatus comprising a plurality of Off/On switches each comprising a transistor having a collector electrode making operative contact with a first rectifying junction, a base electrode and an emitter electrode, an input circuit for each of said transistors, means for applying said signal wave to each of said input circuits, an output circuit connected between the collector and emitter electrode of each of said transistors, biasing means defining a unique threshold On/Off level for each of said transistors, each of said threshold levels corresponding to one of said quantum levels, and means for producing an output representative of binary 1 for each of said transistors in response to input signals which exceed the said threshold level of its associated transistor, said last-named means comprising means for reducing the resistance from collector to emitter to a value less than 100 ohms, and said transistors each producing an output representative of binary 0 in response to input signals which do not exceed said associated threshold level.

2. The combination in accordance with claim 1 wherein said biasing means each comprise means for applying a reverse bias to the said rectifying junction of its associated transistor.

3. The combination in accordance with claim 1 wherein said biasing means each comprise means for biasing the base current of its associated transistor beyond cut-off.

4. The combination in accordance with claim 1 and means for inhibiting the output of each of said transistors except one in response to input signals exceeding a predetermined level which is greater than the said threshold level for its associated transistor.

5. The combination in accordance with claim 4 wherein each of said predetermined levels is greater than its associated threshold level by an integral number of quantum levels.

6. The combination in accordance with claim 1 wherein said code is the reflected binary code and wherein said plurality equals $2^{n-1}$.

7. The combination in accordance with claim 1 wherein said plurality equals $n$ and wherein each of said $n$ transistors comprises means for determining the binary character of one of said digits, and means for each digit determining transistor except the most significant digit determining transistor for selecting in response to the binary character of higher order digits the said threshold On/Off level for its associated transistor.

8. The combination in accordance with claim 1 wherein said last-named means comprise means for applying control pulses between the base and emitter electrodes of each of said transistors.

9. The combination in accordance with claim 1 wherein said signal applying means comprises means for obtaining periodic amplitude samples of said signal wave and means for applying said samples to said input circuit, and wherein said means for reducing the resistance from collector-to-emitter comprise a source of control pulses sufficient to saturate said base, and means for applying said control pulses between the base and emitter electrodes of each of said transistors.

10. An amplitude comparison circuit for translating a signal wave continuously variable in nature into an $n$ digit binary code, permutations of which represent $2^n$ discrete quantum levels, said circuit comprising a plurality of digit comparators, one for each of said $n$ digits, said digit comparators each comprising switching means for each discrete amplitude range encoded binary 1 for producing an output pulse in response to an input signal having an amplitude within said each discrete range and no output pulse for input signals having amplitudes without said each discrete range, said switching means each comprising a transistor having emitter, base, and collector electrodes, means for applying said signal wave between the base and emitter electrode of each of said transistors, a source of control pulses, means for applying said control pulses between the base and emitter electrode of each of said transistors, means for biasing the base current of each of said transistors beyond cutoff only for input signals of an amplitude less than those within the discrete range associated with that transistor, an output circuit connected across the collector and emitter electrodes of each of said transistors, and means for combining the outputs of said transistors.

11. The combination in accordance with claim 10 and means for inhibiting the output of each of said switching means associated with a discrete amplitude range encoded binary 1 which does not include the quantum level representing the highest encoded quantum level in response to input signals having an amplitude greater than its associated discrete range.

12. The combination in accordance with claim 11 wherein said inhibiting means each comprises a transistor having base, emitter and collector electrodes, means for connecting the collector and emitter electrodes of said inhibiting transistors in shunt with the said output of its associated comparison transistor, means for applying said signal wave between the base and emitter electrodes of said inhibiting transistors in parallel, means for biasing the base current of each of said transistors below cutoff for input signals within and below its associated discrete range encoded binary 1, and On in response to input signals greater than said associated discrete range.

13. The combination in accordance with claim 10 wherein said combining means comprise means for deriving a time sequence of digit pulses from the outputs of said digit comparators.

14. The combination in accordance with claim 10 and a standard pulse shaper comprising a transistor switch having an On condition and an Off condition, means for biasing said transistor in one of said conditions, and means for applying the said combined outputs of said transistors to said transistor switch with a polarity to overcome said bias in response to binary 1 signals.

15. In combination: a plurality of transistors, each of said transistors comprising a body of semiconductive material, a rectifying collector connection to said body, and emitter and base connections also to said body; an input circuit connected between the base and emitter of each of said transistors; an output circuit connected across the collector and emitter of each of said transistors whereby the resistance of each rectifying connections acts as a shunt on its associated output circuit; biasing means for applying potentials to each of said transistors to reversely bias said rectifying connections and to maintain said transistors beyond cutoff in the absence of input signals, said biasing means including means for providing a threshold level for each of said transistors, each of said threshold levels being uniquely related to a predetermined quantum level; and, means for applying to at least one of said input circuits input signals having voltage sufficient to overcome the cutoff bias of its associated biasing means and current sufficient to cause the voltage between its associated collector and base to drop to a value insufficient to maintain the reverse bias of its associated rectifying connection, whereby the collector-to-emitter resistance of the transistor associated with said at least one input circuit is decreased to a very low value relative to the resistance of a reversely biased connection.

16. The combination in accordance with claim 15 wherein said biasing means comprises voltage source means connected in series with each of said emitter electrodes and common to its associated input and output circuits.

17. The combination in accordance with claim 15 wherein said input signals are applied between base and emitter of each transistor, signal source means connected between each of said emitters and a point of reference potential and wherein said output circuits are each connected between the collector of its associated transistor and said point of reference potential.

18. An amplitude comparator for producing an output when and only when a signal voltage exceeds a preselected comparison level comprising a transistor having base, emitter and collector electrodes, said collector electrode making a rectifying connection to said transistor, means for biasing said rectifying connection to a high resistance condition, means for biasing said base electrode substantially beyond cut-off to a reference level, means for periodically changing the bias on said base electrode to a level equal to the difference between said comparison level and said reference level, means for applying said signal voltage to said base electrode, and means for deriving said output from said collector electrode.

19. The combination in accordance with claim 18 and a resistor in series with said first-named biasing means proportioned to allow said rectifying connection to become biased to a low resistance condition when said transistor conducts current.

20. The combination in accordance with claim 18 and a second transistor having base, emitter and collector electrodes, said collector electrode making a rectifying connection to said second transistor, means for connecting the collector-emitter path of said second transistor in shunt with the output of said first transistor, means for biasing said base electrode substantially beyond cut-off to a second reference level, means for periodically changing the bias on said base electrode to a level equal to the difference between said second reference level and a second comparison level, and means for applying said signal voltage to said base electrode of said second transistor.

References Cited in the file of this patent

UNITED STATES PATENTS

| | | |
|---|---|---|
| 2,453,454 | Norwine | Nov. 9, 1948 |
| 2,486,390 | Cunningham | Nov. 1, 1949 |
| 2,539,623 | Heising | Jan. 30, 1951 |
| 2,541,039 | Cole | Feb. 13, 1951 |
| 2,627,039 | MacWilliams | Jan. 27, 1953 |
| 2,629,834 | Trent | Feb. 24, 1953 |
| 2,641,522 | King | June 9, 1953 |
| 2,660,618 | Aigrain | Nov. 24, 1953 |
| 2,665,845 | Trent | Jan. 12, 1954 |

(Other references on following page)

UNITED STATES PATENTS

| | | |
|---|---|---|
| 2,666,861 | Campbell | Jan. 19, 1954 |
| 2,736,765 | Lohman | Feb. 28, 1956 |
| 2,747,111 | Koch | May 22, 1956 |

FOREIGN PATENTS

| | | |
|---|---|---|
| 703,685 | Great Britain | Feb. 10, 1954 |

OTHER REFERENCES

AIEE Communications and Electronics Group Publication, "A Progressive Code Digital Quantizer," by Floyd Raasch—pages 567 to 571. November 1953.

Cooke-Yarborough, "A Versatile Transistor Circuit," Proc. of IEE, September 1954 (proofs made available to public February 15, 1954), pp. 16, 17 relied on.